UNITED STATES PATENT OFFICE.

HERMAN L. HARTENSTEIN, OF CONSTANTINE, MICHIGAN, ASSIGNOR, BY MESNE ASSIGNMENTS, TO CONTINENTAL INVESTMENT COMPANY, OF DULUTH, MINNESOTA, A CORPORATION OF MINNESOTA.

METHOD OF MANUFACTURING CARBID.

1,152,506. Specification of Letters Patent. Patented Sept. 7, 1915.

No Drawing. Application filed February 18, 1907. Serial No. 358,015.

*To all whom it may concern:*

Be it known that I, HERMAN L. HARTENSTEIN, a citizen of the United States, residing at Constantine, in the county of St. Joseph and State of Michigan, have invented certain new and useful Improvements in the Method of Manufacturing Carbid, of which the following is a full, clear, and exact specification.

This invention relates to methods of manufacturing carbids; and it comprises a process of making full-strength calcium carbid by resmelting carbid waste, dust or fines with adjusted quantities of carbon; all as more fully hereinafter set forth and as claimed.

In the commercial production of calcium carbid, and particularly when crushing massive carbid to produce sized or granulated material, much fine or dustlike material is formed and this is not readily utilizable while it deteriorates rapidly through atmospheric action. For use in the ordinary types of acetylene generators, it is of course desirable to use lump or granulated carbid, dustlike carbid being of little use in most types of generators while it is difficult to store and keep. In the prior art, attempts have been made to utilize the carbid fines by directly remelting in an electric furnace and causing the molten material to resolidify in masses, but it has been found that even with comparatively rich, comparatively undeteriorated fines, the product was not of good quality, giving but a low yield of acetylene. The production of acetylene from the remelted carbid by no means corresponds with the apparent quantity of carbid in the original fines treated. This I have discovered to be due to a loss of carbon in the material during the remelting operation; finding that there is a loss of actual carbid during the melting. The fines are, furthermore, difficult to smelt since their conductivity is irregular. The loss is probably due to inter-reaction between the components of and bodies present in the fines. Calcium carbid on exposure to air undergoes superficial oxidation as well as superficially reacting with the moisture of the air to produce calcium oxid and calcium hydrate together with, probably, other compounds, and, in the case of carbid fines, the surface exposed to aerial oxidation and aerial adsorption and absorption is of course indefinitely large. Upon remelting this carbid, the oxidation products diminish the total percentage of reactive carbid in proportion to their amount, as in the original fines, but furthermore there is a more serious loss due to the reaction of the unchanged carbid with the oxidized impurities and with included air. For example, the water of the hydrated lime, and there is usually a relatively considerable amount of this, (and particularly with finely divided fines) during the heating-up of the fines, reacts with the carbid, producing acetylene. Remelting is, furthermore, a difficult operation with the usual types of furnace, since the heterogeneous mixture exhibited by the fines has an irregular conductivity and differs from the usual mixture employed in making carbid.

In the present invention, I have devised a method of recovering good-quality carbid from the comminuted forms of carbid too fine for use in ordinary types of acetylene generators by a process enabling the use of commercial forms of electric furnace. For this purpose, I intimately commingle the waste carbid or carbid fines with a suitable proportion of finely divided carbonaceous matter, such as coke, charcoal, or any good grade of suitable coal, to produce a reaction mixture. The admixture should be thorough and both the reacting bodies, the carbonaceous matter and the carbid, should be finely subdivided. Such a mixture, I find, can be readily treated in the ordinary types of electric furnace in much the same manner as the mixture of calcareous material and carbonaceous materials ordinarily employed in making calcium carbid. After the admixture of the carbonaceous material throughout the mass of fine carbid, the electrical conductivity is regular and uniform, and the reactions take place upon heating in a smooth and regular manner. The amount of carbon employed in the reaction mixture should be at least enough to prevent the oxidation of calcium carbid by oxygen and oxidized bodies present and capable of acting upon such carbid; that is, there must be at least enough carbon to reduce moisture to hydrogen, carbon dioxid to carbon monoxid, etc. With this amount of carbon present, a more active reducing material than calcium carbid is presented to the oxidants and a reduction in the amount of calcium carbid during the melting is prevented. There should be, preferably, further enough carbon also to reduce and form calcium carbid with all the calcium present in forms other than calcium carbid, such as calcium hydrate, oxid, carbonate, etc.

In the practical embodiment of my invention, I preliminarily analyze the waste carbid, since its composition varies extremely, varying not only with its age, its state of subdivision, the composition of the atmosphere which has had access, the time contact factor, the density of the carbid, etc., and ascertain not only the amount of unchanged calcium carbid present but also the amount of oxidants capable of effecting changes in the carbid during the heating operation. I then intimately commingle the carbid with the desired amount of carbon, using at least, as stated, the amount corresponding to the oxidants, and preferably enough also to reduce and combine with non-carbid calcium. I then fuse the mixture, preferably using an electric furnace. In the presence of the shielding carbon, the carbid is protected and goes through the fusing operation unaffected. Moisture, carbon dioxid and such other oxidized compounds as are capable of oxidizing the carbid act merely upon this shielding carbon. With the preferable extra amount of carbon, the lime and calcium carbonate present are also reduced with the formation of calcium carbid. In other words, I employ carbon in amount at least sufficient to nullify the action of the contained oxidants and shield the contained carbid, and preferably also enough to form more carbid from such calcium as may have been oxidized.

In adding the carbonaceous material to the carbid fines or dust the carbonaceous material is first reduced to a comminuted or pulverized condition, as usual in the manufacture of carbid, and it is thoroughly mixed and commingled with the fine carbid. The charge is then ready for reduction and is introduced in the ordinary or any suitable electric furnace, but preferably in one which possesses electrodes capable of easy adjustment so as to be placed the proper distance apart for fusing the particular charge of material under treatment. The charge is thus subjected to the electric current until reduced to molten condition, and may be allowed to stand until solidified, or tapped from the furnace and formed into ingots or run into molds according to common practice (see my patent 619,220). The carbon thus produced will be found to be of high grade and much superior in gas producing qualities to the waste carbid or dust which was utilized in its production.

What I claim is:

1. The process of recovering carbid waste which comprises intimately commingling such carbid waste with finely divided carbon to produce a reaction mixture and subjecting such mixture to a fusing heat.

2. The process of recovering carbid waste which comprises intimately commingling such carbid waste with finely divided carbon to produce a reaction mixture and subjecting such mixture to a fusing heat, such carbon being in amount at least sufficient to reduce the oxidized bodies present capable of reacting on carbid.

3. The process of recovering carbid waste which comprises intimately commingling such carbid waste with finely divided carbon to produce a reaction mixture and subjecting such mixture to a fusing heat, such carbon being in amount in excess of that required to reduce the oxidized bodies present capable of reacting on carbid.

4. The process of recovering carbid waste which comprises intimately commingling such carbid waste with finely divided carbon to produce a reaction mixture and subjecting such mixture to a fusing heat, such carbon being in amount sufficient to reduce the oxidized bodies present capable of reacting upon carbid and also to form carbid with the calcium existing in other forms than carbid.

5. The process of utilizing calcium carbid waste, which consists in intimately commingling the waste with finely-divided carbon, in amount at least sufficient to reduce the calcium oxid present in the waste, and subjecting the mixture to a fusing heat.

6. The process of producing massive bodies of calcium carbid of high grade which comprises intimately commingling comminuted calcium carbid with finely divided carbon to produce a reaction mixture and subjecting such mixture to a fusing heat, such carbon being in amount at least sufficient to reduce the oxidized bodies present capable of reacting on calcium carbid.

7. The process of producing massive bodies of calcium carbid of high grade which comprises intimately commingling comminuted calcium carbid with finely divided carbon to produce a reaction mixture, such carbon being in amount at least sufficient to reduce the oxidized bodies present capable of reacting on calcium carbid, subjecting such mixture to a fusing heat, and casting the fused mixture into molds.

In testimony whereof I have signed my name to this specification, in the presence of two subscribing witnesses, on this 16th day of February, A. D. 1907.

HERMAN L. HARTENSTEIN.

Witnesses:
FRANCIS A. HOPKINS,
FRANK T. BROWN.